(12) United States Patent
Park et al.

(10) Patent No.: US 9,195,277 B2
(45) Date of Patent: Nov. 24, 2015

(54) TOUCH PANEL WITH PROXIMITY SENSOR

(71) Applicant: LG INNOTEK CO., LTD., Seoul (KR)

(72) Inventors: Je Won Park, Seoul (KR); Do Young Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 42 days.

(21) Appl. No.: 14/138,685

(22) Filed: Dec. 23, 2013

(65) Prior Publication Data

US 2014/0176830 A1 Jun. 26, 2014

(30) Foreign Application Priority Data

Dec. 21, 2012 (KR) .................. 10-2012-0150794

(51) Int. Cl.
*G06F 1/16* (2006.01)
*G06F 1/32* (2006.01)
*G06F 3/044* (2006.01)

(52) U.S. Cl.
CPC ............ *G06F 1/1692* (2013.01); *G06F 1/3231* (2013.01); *G06F 3/044* (2013.01); *G06F 2203/04108* (2013.01)

(58) Field of Classification Search
CPC .......... G06F 3/044; G06F 2203/04108; G06F 1/3232; G06F 1/3231; G06F 1/1692; G06F 3/041–3/047; G06F 2203/04101
See application file for complete search history.

(56) References Cited

U.S. PATENT DOCUMENTS

| 8,882,286 B1* | 11/2014 | Delgado Antunez ......... 362/104 |
| 2011/0001706 A1* | 1/2011 | Sanford et al. ................ 345/173 |
| 2011/0057899 A1* | 3/2011 | Sleeman et al. .............. 345/174 |
| 2012/0139870 A1* | 6/2012 | Beyly et al. .................... 345/174 |
| 2012/0146919 A1* | 6/2012 | Kim et al. ...................... 345/173 |
| 2013/0180841 A1* | 7/2013 | Yilmaz et al. ................. 200/600 |
| 2014/0043250 A1* | 2/2014 | Yeh .............................. 345/173 |

OTHER PUBLICATIONS

Block, Ryan and Ziegler, Chris, "iPhone Review: Part 1: Hardware, Interface, Keyboard", Jul. 3, 2007, http://www.engadget.com/2007/07/03/iphone-review-part-1-hardware-interface-keyboard/.*

* cited by examiner

*Primary Examiner* — Larry Sternbane
(74) *Attorney, Agent, or Firm* — Saliwanchik, Lloyd & Eisenschenk

(57) ABSTRACT

A touch panel includes a cover window with an active area and an inactive area; a first sensing electrode having a first sensitivity in the active area; and a second sensing electrode having a second sensitivity in the inactive area, wherein the first sensitivity is different from the second sensitivity.

13 Claims, 6 Drawing Sheets

TOUCH PANEL WITH PROXIMITY SENSOR

CROSS-REFERENCE TO RELATED APPLICATION

This application claims the benefit under 35 U.S.C. §119 of Korean Patent Application No. 10-2012-0150794, filed Dec. 21, 2012, which is hereby incorporated by reference in its entirety.

BACKGROUND

The disclosure relates to a touch panel.

Recently, a touch window, which performs an input function through the touch of an image displayed on a display device by an input device such as a stylus pen or a finger, has been applied to various electronic appliances.

The touch window may be representatively classified into a resistive type touch window and a capacitive type touch window. In the resistive type touch window, the position of the touch point is detected by detecting the variation of resistance according to the connection between electrodes when pressure is applied to an input device. In the capacitive type touch window, the position of the touch point is detected by detecting the variation in capacitance between electrodes when a finger of the user is touched on the capacitive type touch window.

The variation in capacitance may be sensed by a touch module, that is, a touch controller located in the touch panel.

Further, the touch panel includes a proximity sensor. The proximity sensor serves to automatically turn-off a liquid crystal backlight or to inhibit a malfunction of the touch panel by sensing approach of an object such as a face during a call.

Further, the touch panel may include various sensors such as an illumination sensor as well as the touch controller and the proximity sensor.

However, when the touch panel includes the above sensors, it is difficult to minimize the touch panel, a process cost is increased and process efficiency is reduced. Accordingly, there is a need for a new touch panel capable of miniaturizing the touch panel and reducing a process cost by substituting a proximity sensor among sensors included in the touch panel.

BRIEF SUMMARY

The embodiment provides a touch panel capable of realizing miniaturization of the touch panel by integrally forming a proximity sense module with a touch module of the touch panel.

According to the embodiment, there is provided a touch panel including: a cover window with an active area and an inactive area; a first sensing electrode having a first sensitivity in the active area; and a second sensing electrode having a second sensitivity in the inactive area, wherein the first sensitivity is different from the second sensitivity.

According to the touch panel of the embodiment, a process of aligning a sensor in an inactive area of the touch panel can be omitted. In detail, a process of aligning a proximity sensor can be omitted.

That is, since the second sensing electrode may perform the same or similar functions as those of the proximity sensor, the proximity sensor can be substituted by the second sensing electrode. Accordingly, a process of aligning the proximity sensor may be omitted from a process of manufacturing the touch panel. Therefore, the process efficiency can be improved and the process cost can be reduced.

In addition, since the proximity sensor aligned in the inactive area may be omitted, a space in the inactive area can be efficiently used and an area of the inactive area can be reduced. Thus, according to the touch panel of the embodiment, the touch panel can be miniaturized.

DETAILED DESCRIPTION

Figure 1:
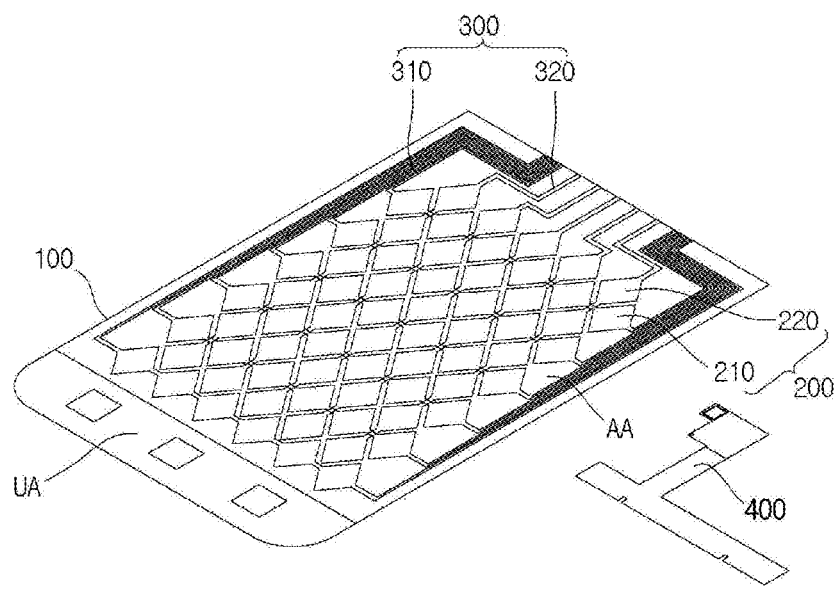
FIG. 1 is a perspective view showing a touch panel according to an embodiment.
Figure 2:
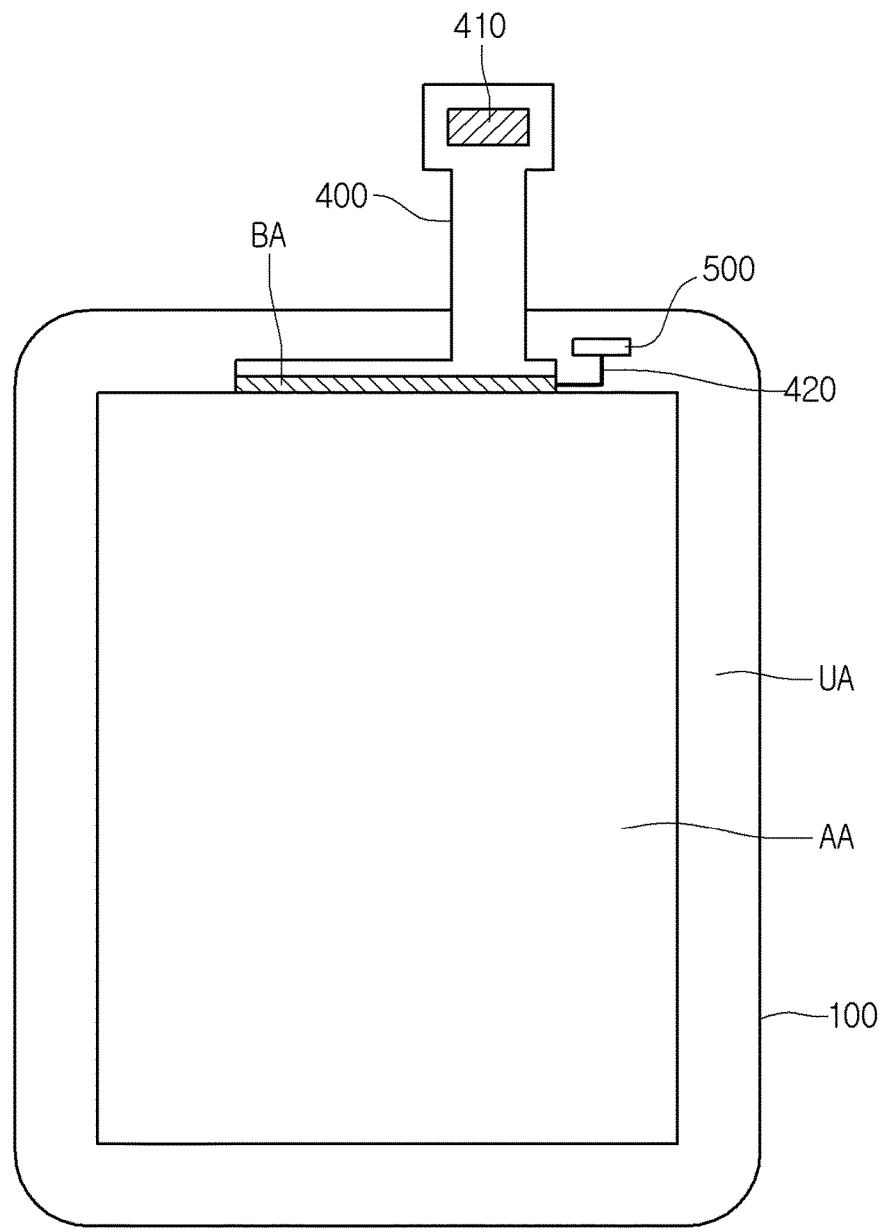
FIG. 2 is a plan view showing a touch panel according to a first embodiment.

In the following description of the embodiments, it will be understood that, when a layer (film), a region, a pattern or a structure is referred to as being "on" or "under" a substrate, another layer (film), region, pad or patterns, it can be "directly" or "indirectly" on the other layer (film), region, pattern or structure, or one or more intervening layers may also be present. Such a position of each layer described with reference to the drawings.

The thickness and size of each layer (film), region, pattern or structure shown in the drawings may be exaggerated, omitted or schematically drawn for the purpose of convenience or clarity. In addition, the size of each layer (film), region, pattern or structure does not utterly reflect an actual size.

Hereinafter, the embodiment will be described in detail with reference to accompanying drawings.

Hereinafter, the touch panel according to the first embodiment will be described with reference to FIGS. 1 to 4.

Referring to FIGS. 1 to 4, the touch panel according to the embodiment may include a cover window with an active area and an inactive area, a first sensing electrode in the active area, a wire electrode aligned in the inactive area, a printed circuit board connected to the wire electrode, and a second sensing electrode aligned in the inactive area.

The cover window 100 includes glass or plastic. For example, the cover window 100 may include strengthened glass, half-strengthened glass, sodalime glass, strengthened plastic, or flexible plastic.

The cover window 100 may include an active area AA and an inactive area UA. The active area AA signifies an area through which a touch instruction of a user may be input. In addition, the inactive area UA has the concept opposite to that of the active area AA, that is, the inactive area UA is not activated even if a user touches the inactive area UA, so the inactive area UA signifies an area through which any touch instructions cannot be input.

The first sensing electrode 200 may be aligned in the active area AA. In detail, the first sensing electrode 200 may be aligned on one surface of the cover window 100. The first sensing electrode 200 may include a first sub-sensing electrode 210 and a second sub-sensing electrode 220. In detail, the first sensing electrode 200 may include the first sub-sensing electrode extending in a first direction and a second sub-sensing electrode 220 extending in a direction different from the first direction. The first sub-sensing electrode 210 and the second sub-sensing electrode 220 may be aligned on one surface of the cover window 100. That is, the first sub-sensing electrode 210 and the second sub-sensing electrode 220 may be aligned on the same plane of the cover window 110.

The first sensing electrode 200 may include a conductive material. For example, the first sensing electrode 200 may include at least one selected from the group consisting of indium tin oxide (ITO), indium zinc oxide (IZO), copper oxide, carbon nano tube (CNT), and silver (Ag) nano wire.

The wire electrode 300 may be aligned in the inactive area UA. The wire electrode 300 may be electrically connected to the first sensing electrode 200. In detail, the wire electrode 300 may include a first wire electrode 310 connected to the first sub-sensing electrode 210 and a second wire electrode 320 connected to the second sub-sensing electrode 220.

The wire electrode may include a conductive material. In detail, the wire electrode may include a metallic material. For example, the wire electrode may include the metallic material such as silver (Ag) or copper (Cu).

The printed circuit board (PCB) 400 may be aligned in the inactive area UA. In detail, the PCB 400 may be connected to the wire electrode 300. For example, the wire electrode 300 may be electrically connected to the PCB 400 using an anisotropic conducting film. Accordingly, the bonding area BA connecting the wire electrode to the printed circuit board may be formed.

The printed circuit board may be flexible. That is, the printed circuit board (PCB) may include a flexible PCB.

The PCB 400 may include a drive chip 410. That is, the drive chip 410 may be mounted on the PCB. The drive chip 410 may sense variation in capacitance according to a touch on a sensing electrode and output a touch signal to the outside so that a touched location may be sensed.

The second sensing electrode 500 may be aligned in the inactive area UA. The second sensing electrode 500 may include a conductive material. In detail, the second sensing electrode 500 may include the same material as that of the first sensing electrode 200. Further, the second sensing electrode 500 may be connected to the PCB 400. In detail, the second sensing electrode 500 may be connected to the PCB 400 through a connection wire 420 and may be electrically connected to the drive chip 410 mounted on the PCB 400.

The first sensing electrode 200 and the second sensing electrode 500 may have mutually different sensitivities. In detail, when the first sensing electrode 200 has a first touch sensitivity and the second sensing electrode 500 has a second touch sensitivity, the first touch sensitivity and the second touch sensitivity may have mutual different values.

The second touch sensitivity may be higher than the first touch sensitivity. That is, the touch sensitivity of the second sensing electrode 500 may be higher than the touch sensitivity of the first sensing electrode 200.

In detail, the second touch sensitivity may be at least about five times higher than the first touch sensitivity. In detail, the second touch sensitivity may be about five times to about ten times higher than the first touch sensitivity.

When the touch sensitivity of the second sensing electrode is less than about five times of the touch sensitivity of the first sensing electrode, a difference in touch sensitivity is small so that the second sensing electrode may not perform the functions of the proximity sensor. When the touch sensitivity of the second sensing electrode exceeds about ten times of the touch sensitivity of the first sensing electrode, the second sensing electrode 500 may be too sensitive to perform the functions of the proximity sensor.

Accordingly, the first sensing electrode 200 and the second sensing electrode 500 may perform mutually different functions when an input device such as a finger approaches on the active area AA. That is, when the input device directly makes contact with the active area AA, the first sensing electrode 200 senses variation in capacitance of a sensing electrode located in the active area AA by the drive chip 410 to detect a touched location.

Meanwhile, since the second sensing electrode 500 has a touch sensitivity higher than that of the first sensing electrode, the second sensing electrode 500 can sense variation in capacitance of the sensing electrode even if the input device does not directly make contact with the active area AA. That is, since the second sensing electrode 500 has a high touch sensitivity, variation in capacitance due to the approach of the object to the active area AA may be sensed even if the object does not directly make contact with the active area AA.

Figure 3:
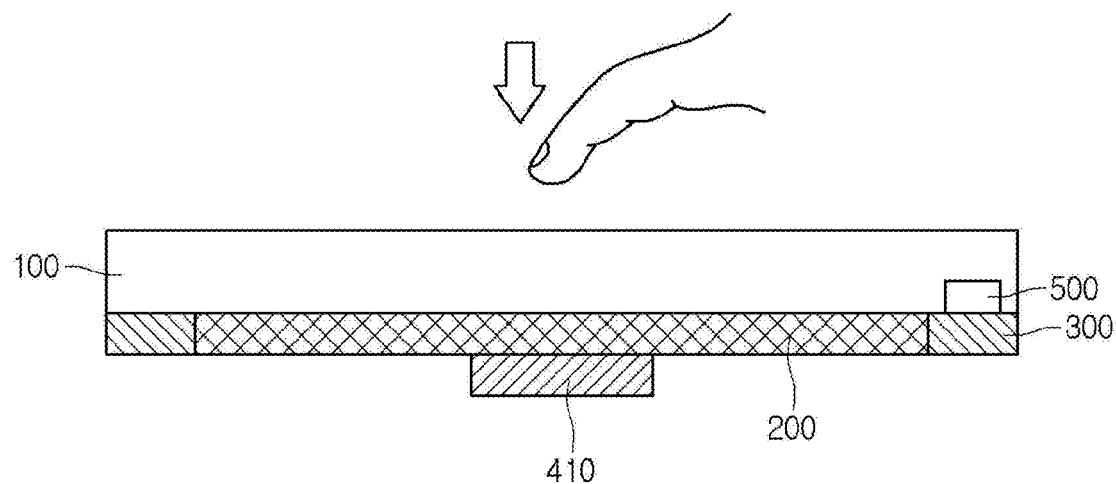
FIGS. 3 and 4 are sectional views illustrating a touch panel according to a first embodiment.
Figure 4:
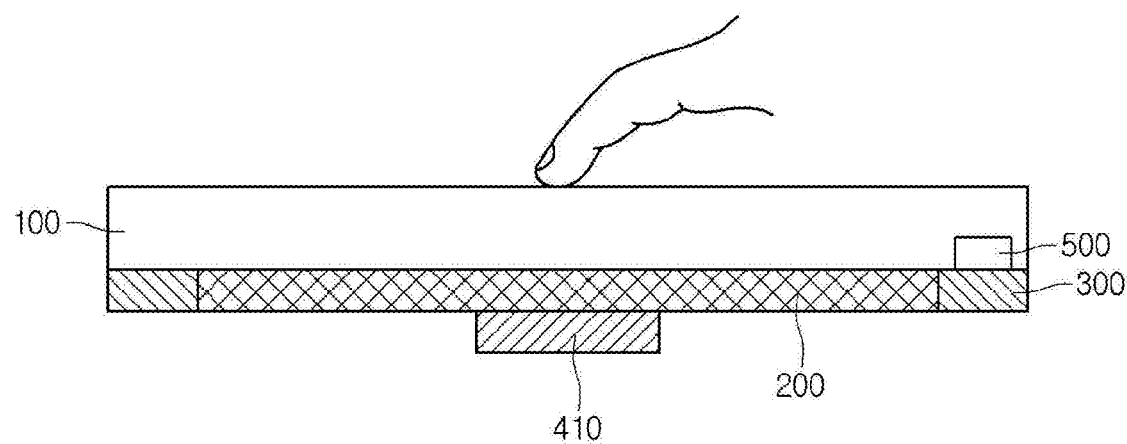

FIGS. 3 and 4 are sectional views illustrating a touch panel according to a first embodiment. Referring to FIGS. 3 and 4, operations of the first sensing electrode 200 and the second sensing electrode 500 in the touch panel are illustrated according to the embodiment.

That is, the input device such as the finger may approach the touch panel. As shown in FIG. 3, when the input device approaches in a direction of the touch panel, only the second sensing electrode 500 may be operated. That is, since the second sensing electrode 500 has higher touch sensitivity than the first sensing electrode 200, when the input device approaches in the direction of the touch panel, variation in capacitance due to the approach of the input device may be sensed by the second sensing electrode 500.

Meanwhile, as shown in FIG. 4, when the input device such as the finger makes contact with the touch panel, the variation in the capacitance of the first sensing electrode may be sensed. That is, when the input device directly makes contact with the touch panel, variation in capacitance of the first sensing electrode 200 formed at the touch panel may be sensed to detect a touched location by the drive chip.

That is, the drive chip may receive the variation in the capacitance of the first sensing electrode 200 and output a touch signal through an output terminal to detect the touched location.

Accordingly, the second sensing electrode 500 may sense the variation in the capacitance according to the approach of an object in a direction of the touch panel to sense movement, that is, a distance of the object approaching in the direction of the touch panel. That is, the second sensing electrode may serve as a proximity sensor in the touch panel according to the related art.

Accordingly, a process of aligning the proximity sensor may be omitted from the touch panel according to the embodiment. That is, since the second sensing electrode may perform the same or similar functions as those of the proximity sensor, the proximity sensor can be substituted by the second sensing electrode. Accordingly, a process of aligning the proximity sensor may be omitted from a process of manufacturing the touch panel. Therefore, the process efficiency can be improved and the process cost can be reduced.

Hereinafter, a touch panel according to the second embodiment will be described with reference to FIG. 5. The second embodiment will be described by making reference to the above description of the touch panel according to the first embodiment. That is, a description of the same parts as those of the touch panel according to the first embodiment will be omitted, and only a second sensing electrode, which is different from the touch panel according to the first embodiment, will be described.

Figure 5:
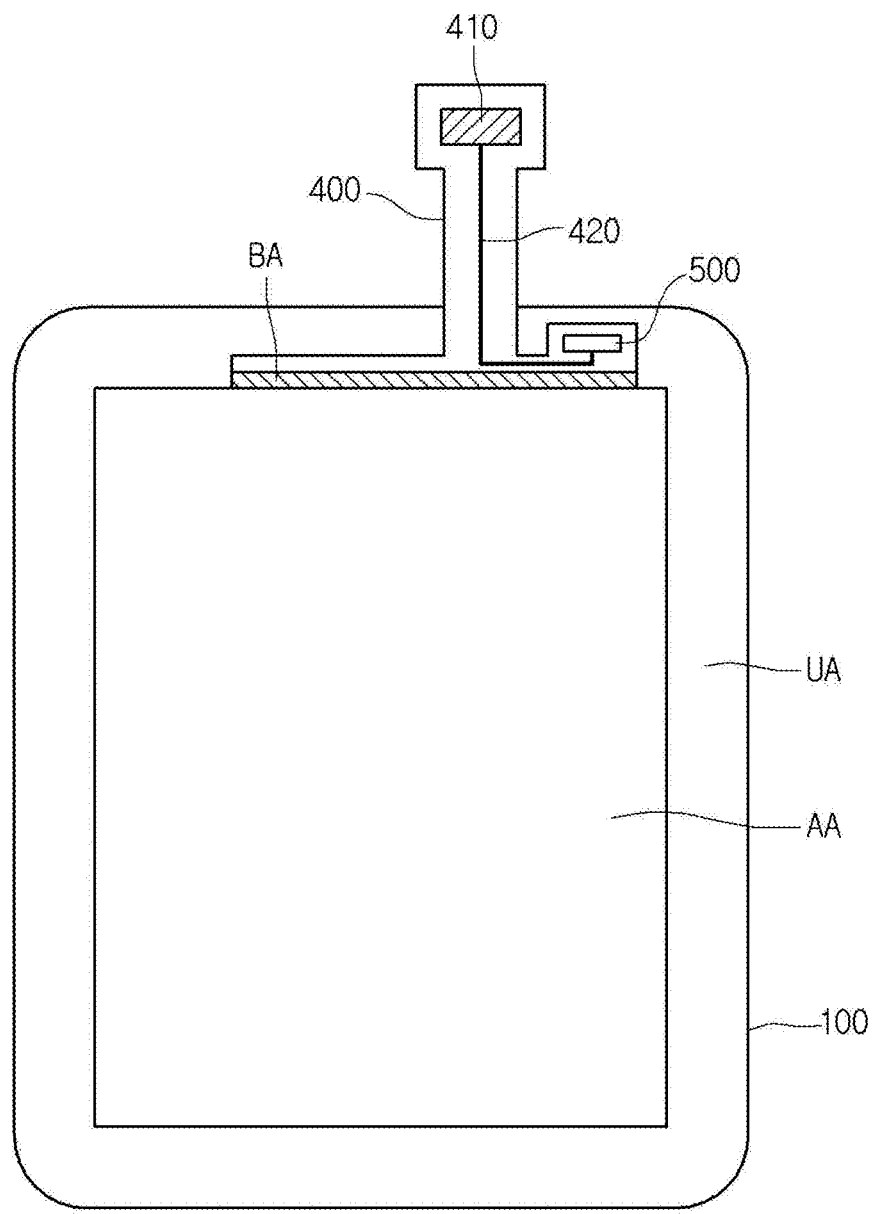
FIG. 5 is a plan view illustrating a touch panel according to a second embodiment.

Referring to FIG. 5, in the touch panel according to the second embodiment, a second sensing electrode may be mounted on a printed circuit board. The second sensing electrode may be mounted on the printed circuit board, and may be electrically connected to a drive chip mounted on the printed circuit board.

Accordingly, a process of aligning the proximity sensor may be omitted from the touch panel according to the second embodiment. That is, since the second sensing electrode may perform the same or similar functions as those of the proximity sensor, the proximity sensor can be substituted by the second sensing electrode.

In addition, since a process of aligning the proximity sensor in the inactive area may be omitted, a space in the inactive area can be efficiently used and an area of the inactive area can be reduced. Thus, according to the touch panel of the embodiment, the size of the touch panel can be miniaturized.

Hereinafter, various types of touch panels will be described with reference to FIGS. 6 and 7. The second sensing electrode described above is applicable to the touch panel shown in FIGS. 6 and 7.

Figure 6:
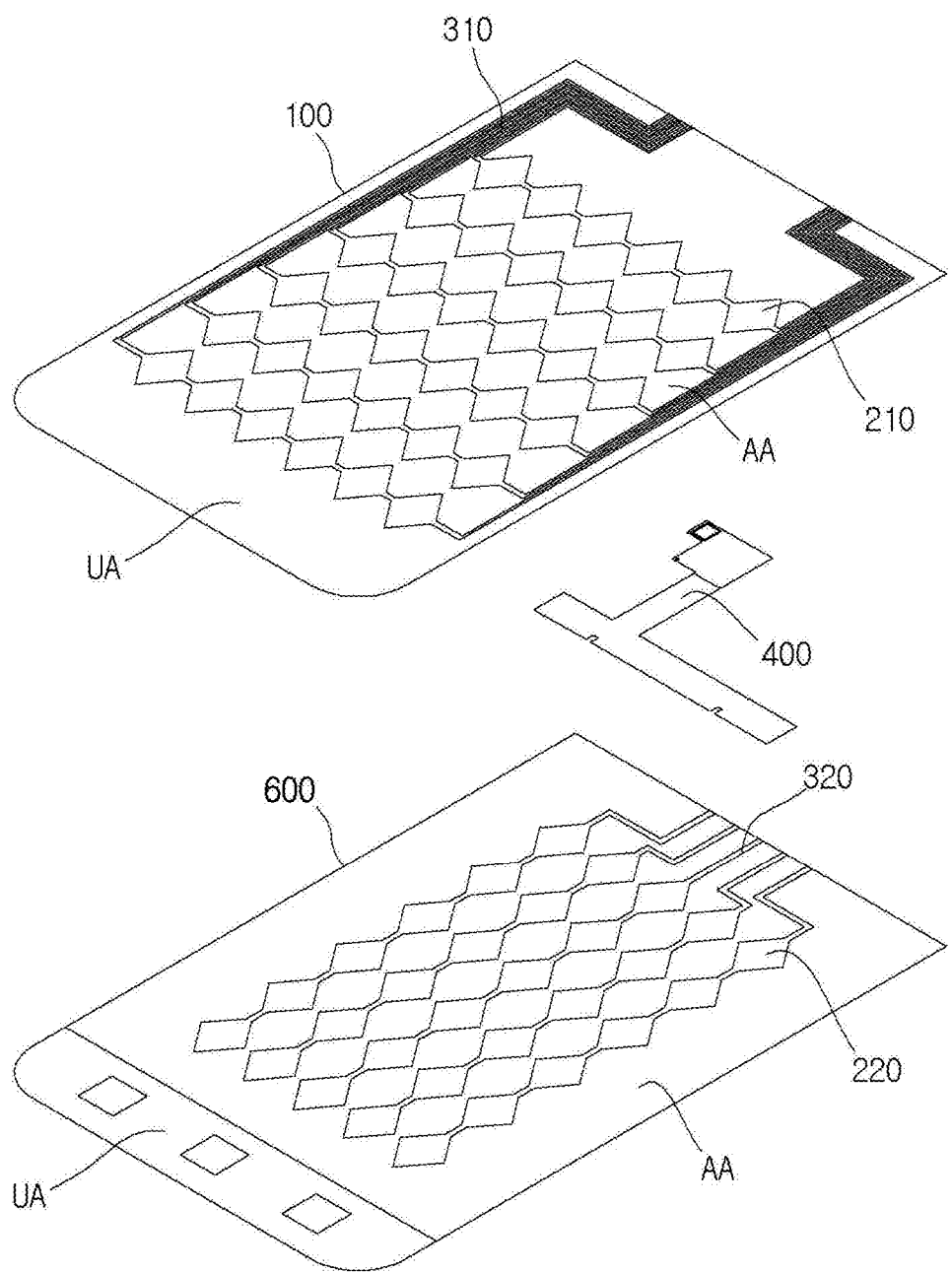
FIGS. 6 and 7 are perspective views illustrating various types of touch panels.

Although it has been illustrated in FIG. 1 that the sensing electrode is arranged only at the cover window, referring to FIG. 6, a substrate may be further arranged on the cover window.

The substrate may include plastic. For example, the substrate may include plastic such as poly ethylene terephthalate (PET).

In this case, the sensing electrode and the wire electrode may be aligned on the cover window and the substrate, respectively. In detail, the first sub-sensing electrode and the first wire electrode are aligned on the cover window, and the second sub-sensing electrode and the second wire electrode may be aligned on the substrate.

Figure 7:
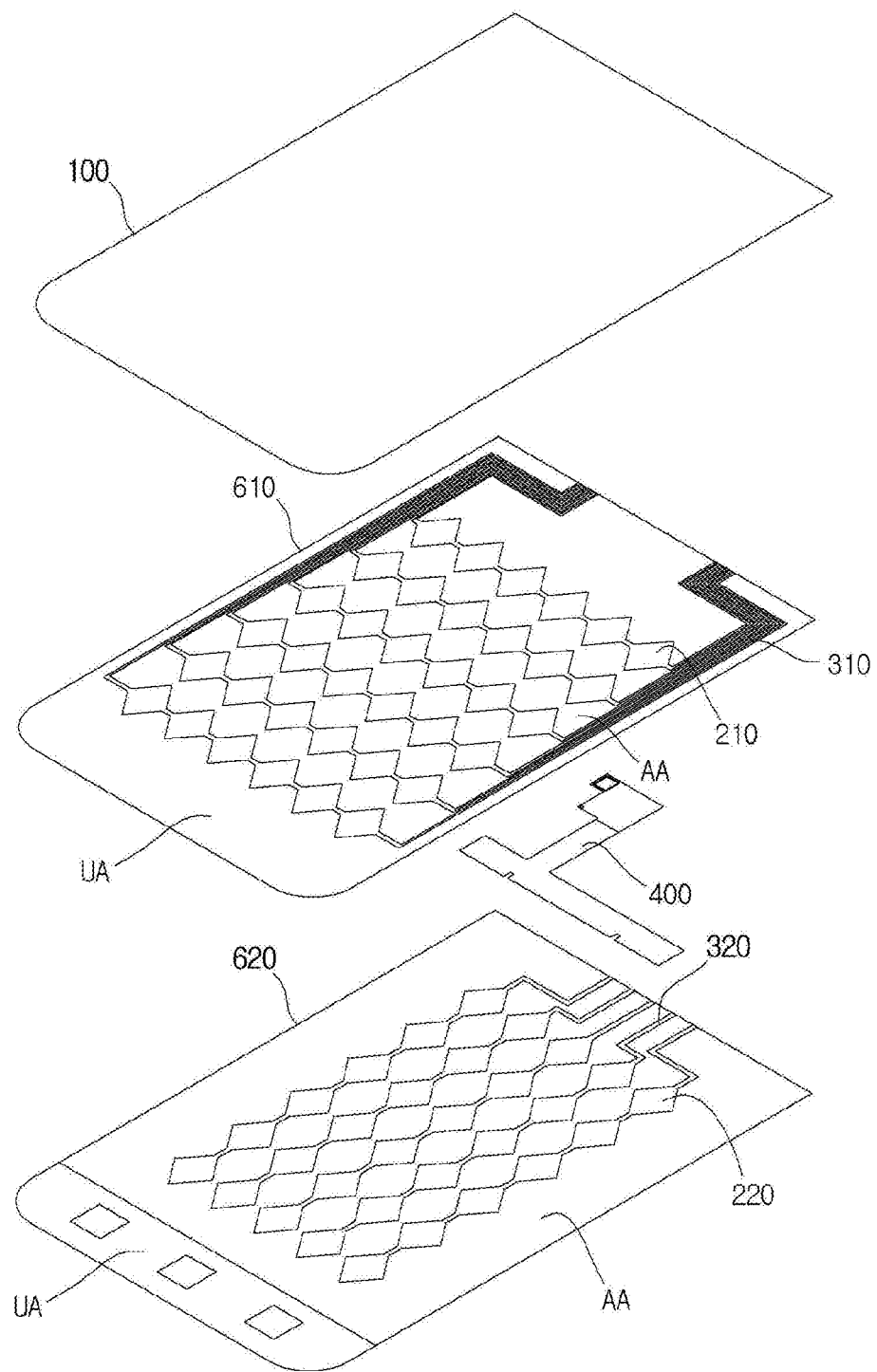

Further, referring to FIG. 7, a first substrate may be further aligned on the cover window and a second substrate may be further aligned on the first substrate.

In this case, the sensing electrode and the wire electrode may be aligned on the first substrate and the second substrate, respectively. In detail, the first sub-sensing electrode and the first wire electrode may be aligned on the first substrate, and the second sub-sensing electrode and the second wire electrode may be aligned on the second substrate.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
   a cover window with an active area and an inactive area;
   a first sensing electrode having a first sensitivity in the active area; and
   a second sensing electrode having a second sensitivity in the inactive area,
   wherein the first sensitivity is different from the second sensitivity, and
   wherein the second sensing electrode includes a same material as that of the first sensing electrode.

2. The touch panel of claim 1, wherein the second sensitivity is higher than the first sensitivity.

3. The touch panel of claim 2, wherein the second sensitivity is at least five times higher than the first sensitivity.

4. The touch panel of claim 2, further comprising:
   a wire electrode connected to the first sensing electrode; and
   a printed circuit board connected to the wire electrode.

5. The touch panel of claim 4, wherein the printed circuit board comprises a drive chip, and
   the second sensing electrode is connected to the drive chip.

6. The touch panel of claim 4, wherein the second sensing electrode is mounted on the printed circuit board.

7. The touch panel of claim 6, wherein the printed circuit board comprises a drive chip, and
   the second sensing electrode is connected to the drive chip.

8. The touch panel of claim 1, wherein the first sensing electrode comprises:
   a first sub-sensing electrode extending in a first direction; and
   a second sub-sensing electrode extending in a direction different from the first direction.

9. The touch panel of claim 8, wherein the first sub-sensing electrode and the second sub-sensing electrode are aligned on a same plane of the cover window.

10. The touch panel of claim 8, further comprising a substrate on the cover window,
    wherein the first sub-sensing electrode is aligned on the cover window and the second sub-sensing electrode is aligned on the substrate.

11. The touch panel of claim 8, further comprising:
    a first substrate on the cover window; and
    a second substrate on the first substrate,
    wherein the first sub-sensing electrode is aligned on the first substrate and the second sub-sensing electrode is aligned on the second substrate.

12. The touch panel of claim 1, wherein the second sensitivity is from five to ten times higher than the first sensitivity.

13. A touch panel comprising:
    a cover window with an active area and an inactive area;
    a first sensing electrode having a first sensitivity in the active area; and
    a second sensing electrode having a second sensitivity in the inactive area,
    wherein the first sensitivity is different from the second sensitivity, and
    wherein the second sensitivity is from five to ten times higher than the first sensitivity.

* * * * *